United States Patent
Lim et al.

(10) Patent No.: US 11,437,683 B2
(45) Date of Patent: Sep. 6, 2022

(54) BATTERY CELL OF VENTING STRUCTURE USING TAPING

(71) Applicant: LG Chem, Ltd., Seoul (KR)

(72) Inventors: Seong Yoon Lim, Daejeon (KR); Ji Hyun Kim, Daejeon (KR)

(73) Assignee: LG Energy Solution, Ltd.

(*) Notice: Subject to any disclaimer, the term of this patent is extended or adjusted under 35 U.S.C. 154(b) by 133 days.

(21) Appl. No.: 16/838,339

(22) Filed: Apr. 2, 2020

(65) Prior Publication Data

US 2020/0235360 A1    Jul. 23, 2020

Related U.S. Application Data

(63) Continuation of application No. 15/754,000, filed as application No. PCT/KR2016/010191 on Sep. 9, 2016, now Pat. No. 10,651,441.

(30) Foreign Application Priority Data

Oct. 28, 2015 (KR) .......................... 10-2015-0149838

(51) Int. Cl.
*H01M 4/00*      (2006.01)
*H01M 50/35*    (2021.01)
(Continued)

(52) U.S. Cl.
CPC .............. *H01M 50/35* (2021.01); *H01M 4/26* (2013.01); *H01M 10/052* (2013.01);
(Continued)

(58) Field of Classification Search
CPC ...... H01M 50/20; H01M 50/35; H01M 50/10; H01M 50/183; H01M 50/124; H01M 10/052
See application file for complete search history.

(56) References Cited

U.S. PATENT DOCUMENTS

2004/0166406 A1    8/2004   Higuchi et al.
2011/0076529 A1    3/2011   Mizuta et al.
(Continued)

FOREIGN PATENT DOCUMENTS

CN         1505180 A      6/2004
CN       102782897 A     11/2012
(Continued)

OTHER PUBLICATIONS

Chinese Search Report for Application No. CN201680049510.5 dated Jun. 30, 2020.
(Continued)

*Primary Examiner* — Cynthia H Kelly
*Assistant Examiner* — Monique M Wills
(74) *Attorney, Agent, or Firm* — Lerner, David, Littenberg, Krumholz & Mentlik, LLP

(57) ABSTRACT

A battery cell of a venting structure using taping is disclosed. The battery cell includes a battery case including a first case and a second case, at least one of the first and second cases being provided with a receiving part for receiving the electrode assembly, thermally bonded edges for sealing the receiving part being provided outside the receiving part, a positive electrode lead and a negative electrode lead protruding outward from the battery case, and an electrode assembly received in the battery case, the electrode assembly having electrode tabs protruding from one end thereof, the electrode tabs being coupled to the positive electrode lead and the negative electrode lead, wherein seal reinforcement tapes are attached to some of the thermally bonded edges so as to surround outer ends of the some thermally bonded edges.

20 Claims, 9 Drawing Sheets

(51) Int. Cl.
  *H01M 4/26* (2006.01)
  *H01M 10/052* (2010.01)
  *H01M 50/10* (2021.01)
  *H01M 50/20* (2021.01)
  *H01M 50/30* (2021.01)
  *H01M 50/124* (2021.01)
  *H01M 50/183* (2021.01)
  *H01M 50/557* (2021.01)
  *H01M 10/0525* (2010.01)

(52) U.S. Cl.
  CPC ....... *H01M 10/0525* (2013.01); *H01M 50/10* (2021.01); *H01M 50/124* (2021.01); *H01M 50/183* (2021.01); *H01M 50/20* (2021.01); *H01M 50/30* (2021.01); *H01M 50/557* (2021.01)

(56) References Cited

U.S. PATENT DOCUMENTS

| | | | |
|---|---|---|---|
| 2011/0123844 A1* | 5/2011 | Bhardwaj | H01M 50/543 429/56 |
| 2011/0311862 A1 | 12/2011 | Ahn | |
| 2012/0077075 A1* | 3/2012 | Tani | H01M 10/0525 429/153 |
| 2012/0148888 A1 | 6/2012 | Yun | |
| 2012/0328934 A1 | 12/2012 | Watanabe et al. | |
| 2013/0071696 A1* | 3/2013 | Kim | H01M 50/572 429/7 |
| 2014/0011060 A1 | 1/2014 | Yang et al. | |
| 2014/0356704 A1* | 12/2014 | Lim | H01M 10/0585 429/211 |
| 2017/0012252 A1 | 1/2017 | Yoo et al. | |

FOREIGN PATENT DOCUMENTS

| | | |
|---|---|---|
| JP | H11097070 A | 4/1999 |
| JP | H11297280 A | 10/1999 |
| JP | 2000100399 A | 4/2000 |
| JP | 2001093489 A | 4/2001 |
| JP | 2001250516 A | 9/2001 |
| JP | 2006236775 A | 9/2006 |
| JP | 2007265879 A | 10/2007 |
| JP | 2013157286 A | 8/2013 |
| KR | 20110139108 A | 12/2011 |
| KR | 20120039469 A | 4/2012 |
| KR | 20120069319 A | 6/2012 |
| KR | 20130048419 A | 5/2013 |
| KR | 20130097881 A | 9/2013 |
| KR | 20130117637 A | 10/2013 |
| KR | 20140055641 A | 5/2014 |
| KR | 20150055775 A | 5/2015 |
| KR | 20150101551 A | 9/2015 |

OTHER PUBLICATIONS

Chinese Search Report for Application No. 201680049510.5 dated Sep. 28, 2020, 1 page.
Extended European Search Report including Written Opinion for Application No. EP16860089.8 dated May 29, 2018.
International Search Report for Application No. PCT/KR2016/010191, dated Dec. 8, 2016.

* cited by examiner

500

600

700

BATTERY CELL OF VENTING STRUCTURE USING TAPING

CROSS-REFERENCE TO RELATED APPLICATIONS

The present application is a continuation of U.S. patent application Ser. No. 15/754,000, filed on Feb. 21, 2018 which is a national phase entry under 35 U.S.C. § 371 of International Application No. PCT/KR2016/010191, filed Sep. 9, 2016, which claims priority from Korean Patent Application No. 10-2015-0149838 filed on Oct. 28, 2015 with the Korean Intellectual Property Office, the disclosures of which are incorporated herein by reference in their entireties.

TECHNICAL FIELD

The present invention relates to a battery cell of a venting structure using taping.

BACKGROUND

In recent years, a secondary battery, which can be repeatedly charged and discharged, has been widely used as an energy source for wireless mobile devices. In addition, the secondary battery has attracted considerable attention as an energy source for electric vehicles and hybrid electric vehicles, which have been developed to solve problems, such as air pollution, caused by existing gasoline and diesel vehicles that use fossil fuels. As a result, kinds of applications using the secondary battery are being increased owing to advantages of the secondary battery, and hereafter the secondary battery is expected to be applied to more applications and products than now.

Based on the construction of electrodes and an electrolyte, the secondary battery may be classified as a lithium ion battery, a lithium ion polymer battery, or a lithium polymer battery. In particular, the lithium ion polymer battery has been increasingly used because the lithium ion polymer battery has a low possibility of electrolyte leakage and can be easily manufactured. Based on the shape of a battery case, the secondary battery may also be classified as a cylindrical battery having an electrode assembly mounted in a cylindrical metal can, a prismatic battery having an electrode assembly mounted in a prismatic metal can, or a pouch-shaped battery having an electrode assembly mounted in a pouch-shaped case made of an aluminum laminate sheet. The electrode assembly mounted in the battery case functions as a power generating element, including a positive electrode, a negative electrode, and a separator interposed between the positive electrode and the negative electrode, which can be charged and discharged. The electrode assembly may be classified as a jelly-roll type electrode assembly configured to have a structure in which a long sheet type positive electrode and a long sheet type negative electrode, to which active materials are applied, are wound in the state in which a separator is disposed between the positive electrode and the negative electrode or a stacked type electrode assembly configured to have a structure in which a plurality of positive electrodes having a predetermined size and a plurality of negative electrodes having a predetermined size are sequentially stacked in the state in which separators are disposed respectively between the positive electrodes and the negative electrodes.

Much interest is currently focused on the increase in size of a case and the decrease in thickness of a material based on the increase in capacity of batteries. As a result, a pouch-shaped battery cell, configured to have a structure in which a stacked type or stacked/folded type electrode assembly is mounted in a pouch-shaped battery case made of an aluminum laminate sheet, have been increasingly used because the cost of manufacturing the pouch-shaped battery is low, the pouch-shaped battery is lightweight, and it is easy to modify the shape of the pouch-shaped battery.

FIG. 1 is a perspective view typically showing a conventional representative pouch-shaped battery.

Referring to FIG. 1, the pouch-shaped battery, denoted by reference numeral 10, is configured to have a structure in which two electrode leads 11 and 12 protrude from the upper end and the lower end of a battery body 13, respectively, such that the electrode leads 11 and 12 are opposite to each other. The electrode leads 11 and 12 are provided at the respective ends of the battery body 13 such that the electrode leads 11 and 12 are located on the same axis while the electrode leads 11 and 12 are located at the middle of the battery body 13.

A sheathing member 14 includes upper and lower sheathing parts. That is, the sheathing member 14 is a two-unit member. In the state in which an electrode assembly is mounted in a receiving part 13 which is defined between the upper and lower sheathing parts of the sheathing member 14, opposite sides 14b and upper and lower ends 14a and 14c, which are contact regions of the upper and lower sheathing parts of the sheathing member 14, are bonded to each other. The sheathing member 14 is configured to have a laminate structure of a resin layer, a metal foil layer, and a resin layer. Consequently, it is possible to bond the opposite sides 14b and the upper and lower ends 14a and 14c of the upper and lower sheathing parts of the sheathing member 14, which are in contact with each other, to each other by applying heat and pressure to the opposite sides 14b and the upper and lower ends 14a and 14c of the upper and lower sheathing parts of the sheathing member 14 so as to weld the resin layers thereof to each other.

In the pouch-shaped battery, a large amount of gas may be generated in the battery case and the pressure in the battery case may be increased under the extreme conditions, such as high temperature, high voltage, and high current, with the result that the battery may be ignited or exploded. In order to solve this problem, it is necessary to discharge the gas out of the battery case.

During charge and discharge of the pouch-shaped battery, high pressure is induced in the sealed battery case, with the result that the battery case may swell. In this case, the sealed portion of the battery case may be broken, whereby gas may be discharged out of the battery case. In this case, however, it is not possible to check the portion of the battery case from which gas has been discharged through the broken region of the sealed portion.

Meanwhile, a gas discharge member may be attached to a portion of the battery case in order to discharge gas of the battery case. In this case, however, the cost and process of manufacturing the gas discharge member are increased.

Technical Problem

Therefore, the present invention has been made to solve the above problems and other technical problems that have yet to be resolved.

Specifically, it is an object of the present invention to provide a battery cell configured to have a structure in which seal reinforcement tapes are attached to some thermally bonded edges so as to surround outer ends of the thermally bonded edges such that gas generated in a receiving part during charge and discharge of the battery cell is discharged out of the receiving part through venting guide parts located at the remainder of the thermally bonded edges to which the seal reinforcement tapes are not attached, thereby improving the safety of the battery cell while manufacturing the battery cell through a simplified manufacturing process.

Technical Solution

In accordance with one aspect of the present invention, the above and other objects can be accomplished by the provision of a battery cell of a venting structure using taping, which is a battery cell having an electrode assembly, configured to have a structure in which a separator is interposed between a positive electrode and a negative electrode, mounted in a battery case, the battery cell including a battery case including a first case and a second case, at least one of the first and second cases being provided with a receiving part for receiving the electrode assembly, thermally bonded edges for sealing the receiving part being provided outside the receiving part, a positive electrode lead and a negative electrode lead protruding outward from the battery case, and an electrode assembly received in the battery case, the electrode assembly having electrode tabs protruding from one end thereof, the electrode tabs being coupled to the positive electrode lead and the negative electrode lead, wherein seal reinforcement tapes are attached to some of the thermally bonded edges so as to surround outer ends of the some thermally bonded edges such that gas generated in the receiving part during charge and discharge of the battery cell is discharged out of the receiving part through a venting guide part located at the remainder of the thermally bonded edges to which the seal reinforcement tapes are not attached.

In the battery cell of the venting structure using taping, therefore, high-pressure, high-temperature gas generated in the pouch-shaped battery case is safely discharged in an intended direction, whereby it is possible to prevent ignition and explosion due to the increase in internal pressure of the battery case. In addition, the structure of the battery cell is simplified and the manufacturing process of the battery cell is also simplified, thereby improving the safety of the battery cell.

According to the present invention, the battery case may be a pouch-shaped case made of a laminate sheet comprising a resin layer and a metal layer.

In a concrete example, the thermally bonded edges may include a first thermally bonded edge formed at a region of the battery case at which at least one of the electrode leads is formed, a second thermally bonded edge and a third thermally bonded edge formed at opposite sides of the first thermally bonded edge, and a fourth thermally bonded edge formed at a region of the battery case so as to be opposite the first thermally bonded edge.

In this case, the positive electrode lead may protrude from the first thermally bonded edge, and the negative electrode lead may protrude from the fourth thermally bonded edge.

At this time, the seal reinforcement tapes may be attached to the second thermally bonded edge and the third thermally bonded edge.

In the above structure, the venting guide part may be located at the first thermally bonded edge or the fourth thermally bonded edge.

In addition, the seal reinforcement tapes may be further attached to the remaining regions of the first thermally bonded edge excluding the region of the first thermally bonded edge from which the positive electrode lead protrudes.

In another case, the seal reinforcement tapes may be partially attached to at least one selected from between the second thermally bonded edge and the third thermally bonded edge such that a venting guide part is formed at the at least one selected from between the second thermally bonded edge and the third thermally bonded edge.

At this time, the seal reinforcement tapes may be further attached to the remaining regions of the fourth thermally bonded edge excluding the region of the fourth thermally bonded edge from which the negative electrode lead protrudes.

In another case, both the positive electrode lead and the negative electrode lead may protrude from the first thermally bonded edge.

At this time, the seal reinforcement tapes may be attached to the second thermally bonded edge and the third thermally bonded edge.

In the above structure, the venting guide part may be located at the first thermally bonded edge or the fourth thermally bonded edge.

In a concrete example, the seal reinforcement tapes may be further attached to the remaining regions of the first thermally bonded edge excluding the region of the first thermally bonded edge from which the positive electrode lead and the negative electrode lead protrude.

In the above structure, the seal reinforcement tapes may be partially attached to at least one selected from among the second thermally bonded edge, the third thermally bonded edge, and the fourth thermally bonded edge such that a venting guide part is formed at the at least one selected from among the second thermally bonded edge, the third thermally bonded edge, and the fourth thermally bonded edge.

According to the present invention, the seal reinforcement tapes may be further attached to the remainder of the thermally bonded edges at which the electrode leads are located, and the seal reinforcement tapes attached to the remainder of the thermally bonded edges at which the electrode leads are located may be provided with slits through which the electrode leads extend.

The venting guide part may be located at at least one of the thermally bonded edges to which the seal reinforcement tapes are not attached, and may also be located at at least one of the thermally bonded edges to which the electrode leads are located.

In a concrete example, the second thermally bonded edge and the third thermally bonded edge may be bent vertically toward the outer surface of the receiving part, and the seal reinforcement tapes may be attached to the bent thermally bonded edges so as to surround the bent thermally bonded edges.

In this case, the second thermally bonded edge and the third thermally bonded edge are bent twice or more toward the outer surface of the receiving part, and the seal reinforcement tapes may be attached to the bent thermally bonded edges so as to surround the bent thermally bonded edges.

According to the present invention, each of the seal reinforcement tapes may be an adhesive tape having an adhesive applied to one surface of a film made of an electrically insulative material.

In accordance with another aspect of the present invention, there is provided a battery pack including the battery cell with the above-stated construction.

In accordance with a further aspect of the present invention, there is provided a device including the battery pack as a power source.

The device may be any one selected from among a computer, a mobile phone, a wearable electronic device, a power tool, an electric vehicle, a hybrid electric vehicle, a plug-in hybrid electric vehicle, an electric bicycle, an electric golf cart, and a power storage system.

The structure and manufacturing method of the device are well known in the art to which the present invention pertains, and a detailed description thereof will be omitted.

BRIEF DESCRIPTION OF DRAWINGS

The above and other objects, features and other advantages of the present invention will be more clearly understood from the following detailed description taken in conjunction with the accompanying drawings, in which.

DETAILED DESCRIPTION OF THE EMBODIMENTS

Now, exemplary embodiments of the present invention will be described in detail with reference to the accompanying drawings. It should be noted, however, that the scope of the present invention is not limited by the illustrated embodiments.

Figure 1:
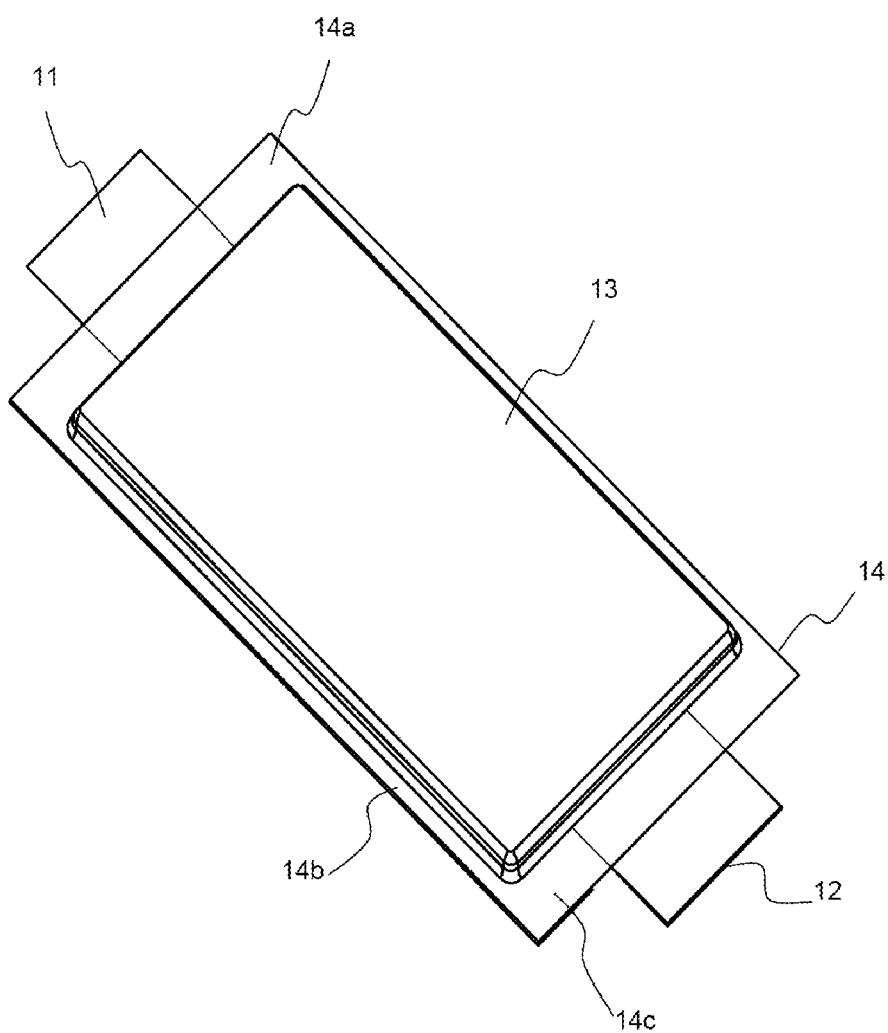
FIG. 1 is a typical view showing a pouch-shaped battery cell including a conventional electrode assembly.
Figure 2:
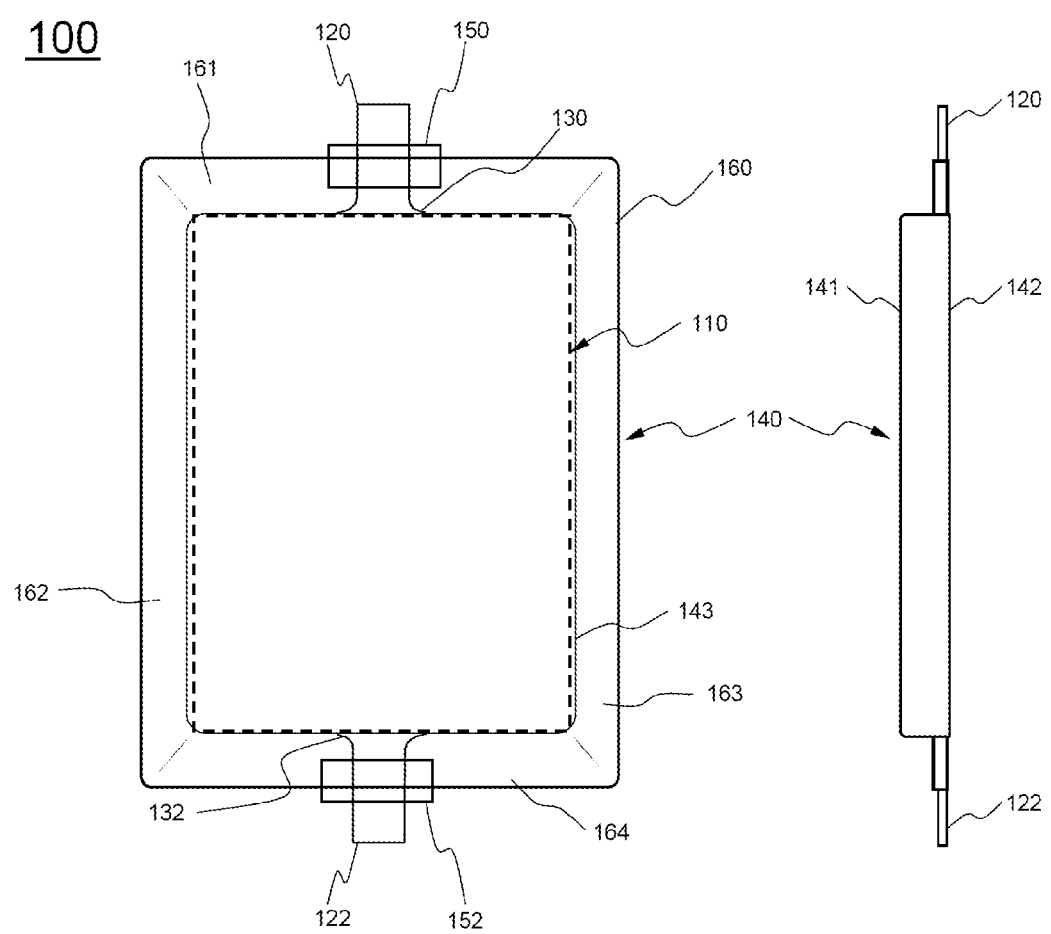
FIG. 2 is a typical view showing a pouch-shaped battery cell according to the present invention.

FIG. 2 is a typical view showing a pouch-shaped battery cell according to an embodiment of the present invention.

Referring to FIG. 2, a pouch-shaped battery cell, denoted by reference numeral 100, includes an electrode assembly 110, electrode tabs 130 and 132 extending from the electrode assembly 110, a positive electrode lead 120 and a negative electrode lead 122 protruding outward from a battery case 140 in opposite directions, and the battery case 140 for receiving the electrode assembly 110.

The battery case 140 includes a first case 141 and a second case 142. An electrode assembly receiving part 143 for receiving the electrode assembly 110 is formed in the first case 141.

The electrode assembly 110 is configured to have a structure in which positive electrodes and negative electrodes are sequentially stacked in the state in which separators are respectively interposed between the positive electrodes and the negative electrodes. The electrode assembly 110 is received in the electrode assembly receiving part 143 of the battery case 140. Thermally bonded edges 160 for sealing are formed outside the electrode assembly receiving part 143.

The thermally bonded edges 160 include a first thermally bonded edge 161 formed at the region of the battery case at which the positive electrode lead 120 is formed, a second thermally bonded edge 162 and a third thermally bonded edge 163 formed at opposite sides of the first thermally bonded edge 161, and a fourth thermally bonded edge 164 formed at the region of the battery case at which the negative electrode lead 122 is formed. The fourth thermally bonded edge 164 is opposite the first thermally bonded edge 161.

The electrode tabs 130 and 132 extend from electrode plates of the electrode assembly 110. The positive electrode lead 120 and the negative electrode lead 122 are electrically connected to the electrode tabs 130 and 132, which extend from the respective electrode plates. The positive electrode lead 120 and the negative electrode lead 122 are partially exposed outward from the battery case 110.

Insulative films 150 and 152 are attached to portions of the upper and lower surfaces of the positive electrode lead 120 and the negative electrode lead 122 in order to improve a seal between the positive electrode lead 120 and the battery case 110 and between the negative electrode lead 122 and the battery case 110 while securing electrical insulation.

Figure 3:
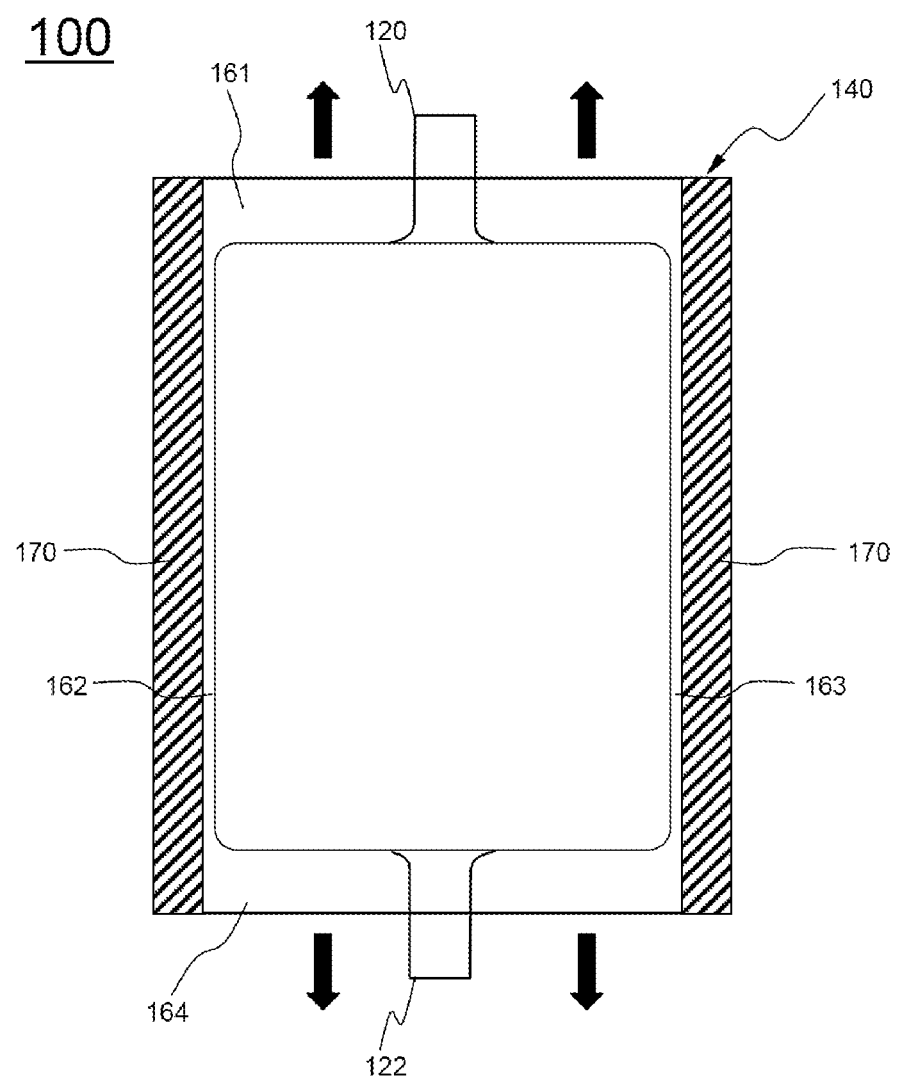
FIG. 3 is a typical view showing a battery cell configured to have a structure in which sealing reinforcement tapes are attached to a second thermally bonded surplus part and a third thermally bonded surplus part according to the present invention shown in FIG. 2.

FIG. 3 is a typical view showing a battery cell configured to have a structure in which sealing reinforcement tapes are attached to a second thermally bonded surplus part and a third thermally bonded surplus part according to the present invention shown in FIG. 2.

Referring to FIG. 3, the positive electrode lead 120 and the negative electrode lead 122 of the battery cell 100 protrude outward from the battery case 140 in opposite directions. As shown, the positive electrode lead 120 protrudes upward from the first thermally bonded edge 161, and the negative electrode lead 122 protrudes downward from the fourth thermally bonded edge 164.

Seal reinforcement tapes 170 are attached to the second thermally bonded edge 162 and the third thermally bonded edge 163, which are located at the sides of the battery case 140, such that the seal reinforcement tapes 170 surround outer ends of the edges.

Gas generated in the receiving part during charge and discharge of the battery cell 100 is discharged out of the receiving part through venting guide parts. The venting guide parts are located at the first thermally bonded edge 161 and the fourth thermally bonded edge 164, to which the seal reinforcement tapes 170 are not attached. Consequently, gas is discharged in the directions indicated by upper and lower arrows.

The structure of the battery cell according to this embodiment is identical to that of the battery cell according to the previous embodiment except that the venting guide parts of the battery cell according to this embodiment are different from those of the battery cell according to the previous embodiment, and therefore a duplicate description thereof will be omitted.

Figure 4:
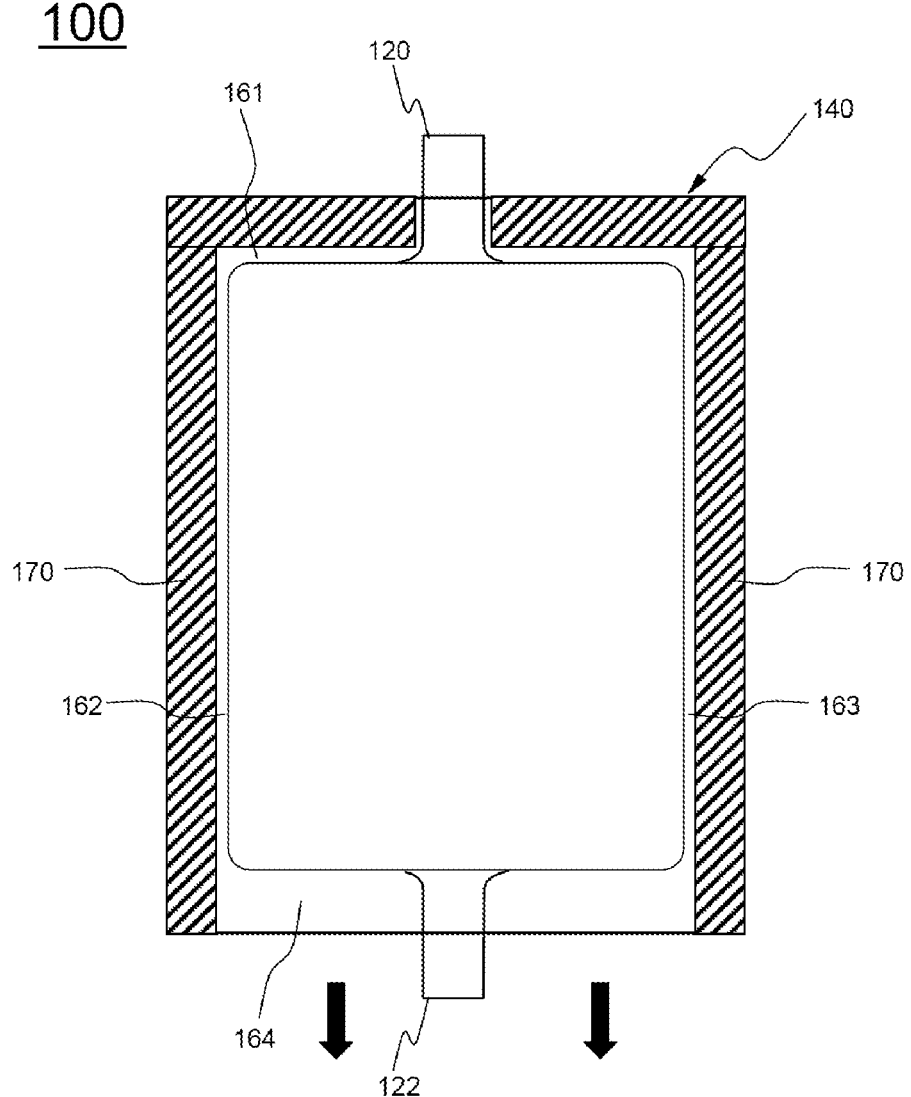
FIG. 4 is a typical view showing a battery cell configured to have a structure in which a sealing reinforcement tape is attached to a first thermally bonded surplus part shown in FIG. 3.

FIG. 4 is a typical view showing a battery cell configured to have a structure in which a tape is attached to the first thermally bonded surplus part shown in FIG. 3.

Referring to FIG. 4, the seal reinforcement tapes 170 are further attached to the remaining regions of the first thermally bonded edge 161 of the battery case 140 excluding the region of the first thermally bonded edge 161 of the battery case 140 from which the positive electrode lead 120 protrudes, i.e. the region of the first thermally bonded edge 161 between the positive electrode lead 120 and the second thermally bonded edge 162 and the region of the first thermally bonded edge 161 between the positive electrode lead 120 and the third thermally bonded edge 163.

The venting guide part is located at the fourth thermally bonded edge 164, at which the negative electrode lead 122 is located and to which the seal reinforcement tape 170 is not attached. Consequently, gas is discharged in the direction indicated by lower arrows.

The structure of the battery cell according to this embodiment is identical to that of the battery cell according to the previous embodiment except that the battery cell according to this embodiment is different from the battery cell according to the previous embodiment in terms of the positions at which the seal reinforcement tapes are attached and the position at which the venting guide parts are located, and therefore a duplicate description thereof will be omitted.

Figure 5:
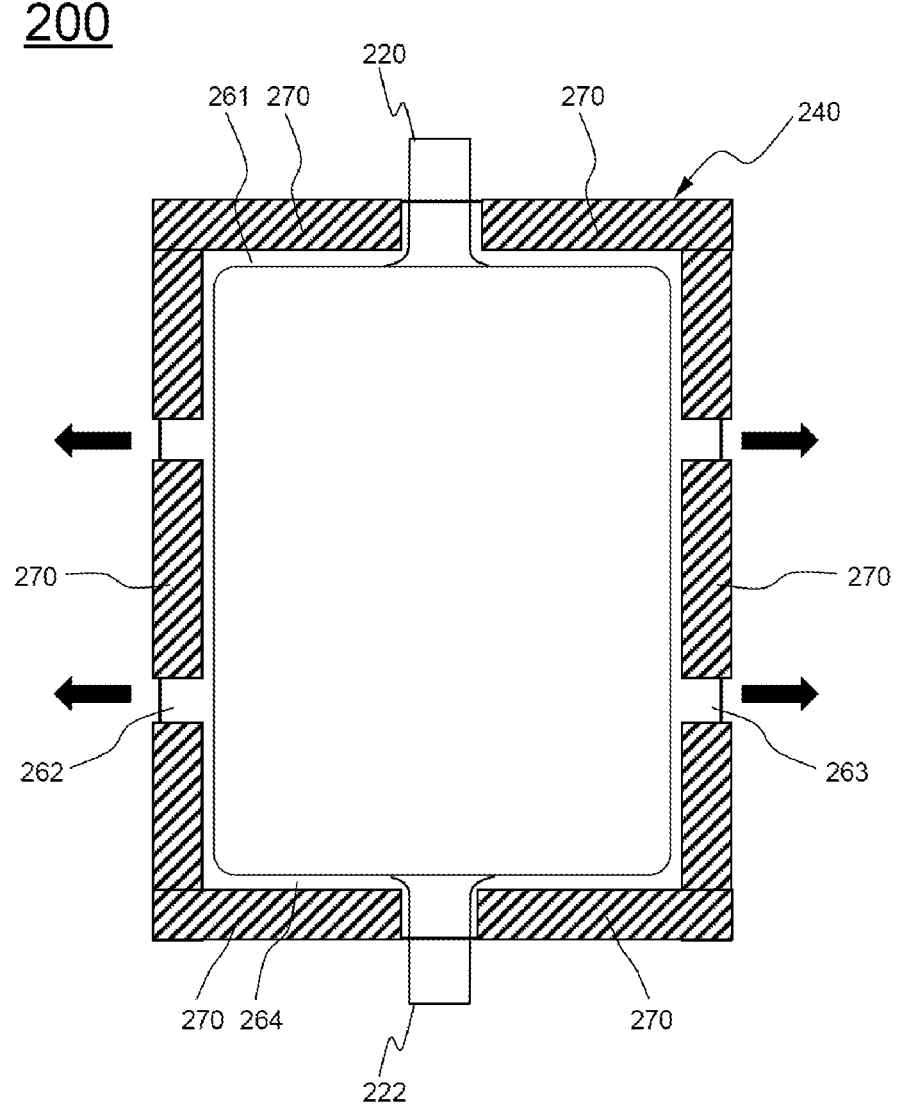
FIG. 5 is a typical view showing a battery cell having sealing reinforcement tapes according to another embodiment of the present invention attached thereto.

FIG. 5 is a typical view showing a battery cell having sealing reinforcement tapes according to another embodiment of the present invention attached thereto.

Referring to FIG. 5, a positive electrode lead 220 of the battery cell, denoted by reference numeral 200, protrudes upward from a first thermally bonded edge 261 of a battery case 240, and a negative electrode lead 222 protrudes downward from a fourth thermally bonded edge 264.

Seal reinforcement tapes 270 are further attached to the remaining regions of the first thermally bonded edge 261 excluding the region of the first thermally bonded edge 261 from which the positive electrode lead 220 protrudes, and are further attached to the remaining regions of the fourth thermally bonded edge 264 excluding the region of the fourth thermally bonded edge 264 from which the positive electrode lead 222 protrudes.

Seal reinforcement tapes 270 are partially attached to a second thermally bonded edge 262 and a third thermally bonded edge 263 such that the seal reinforcement tapes 270 are arranged at intervals so as to form venting guide parts at the second thermally bonded edge 262 and the third thermally bonded edge 263.

The venting guide parts are located at the portions of the second thermally bonded edge 262 and the third thermally bonded edge 263, to which the seal reinforcement tapes 270 are not attached. Consequently, gas is discharged in the directions indicated by lateral arrows.

The structure of the battery cell according to this embodiment is identical to that of the battery cell according to the previous embodiment except that the battery cell according to this embodiment is different from the battery cell according to the previous embodiment in terms of the positions at which the seal reinforcement tapes are attached and the position at which the venting guide parts are located, and therefore a duplicate description thereof will be omitted.

Figure 6:
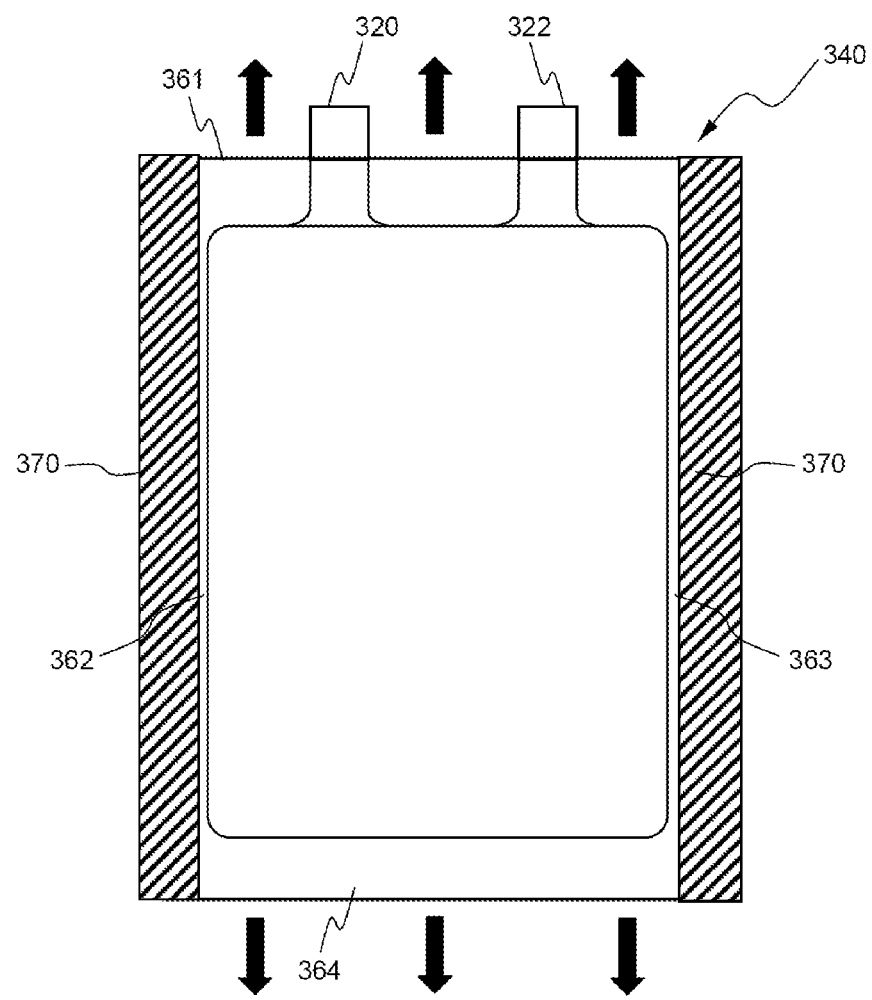
FIG. 6 is a typical view showing a battery cell configured to have a structure in which sealing reinforcement tapes are attached to a second thermally bonded surplus part and a third thermally bonded surplus part according to another embodiment of the present invention.

FIG. 6 is a typical view showing a battery cell configured to have a structure in which tapes are attached to a second thermally bonded surplus part and a third thermally bonded surplus part according to another embodiment of the present invention.

Referring to FIG. 6, both a positive electrode lead 320 and a negative electrode lead 323 of the battery cell, denoted by reference numeral 300, protrude upward from a first thermally bonded edge 361 of a battery case 340. Seal reinforcement tapes 370 are attached to a second thermally bonded edge 362 and a third thermally bonded edge 363.

Venting guide parts are located at the first thermally bonded edge 361 and a fourth thermally bonded edge 364, to which the seal reinforcement tapes 370 are not attached.

The structure of the battery cell according to this embodiment is identical to that of the battery cell according to the previous embodiment except that the battery cell according to this embodiment is different from the battery cell according to the previous embodiment in terms of the positions at which the electrode leads are formed, the positions at which the seal reinforcement tapes are attached, and the position at which the venting guide parts are located, and therefore a duplicate description thereof will be omitted.

Figure 7:
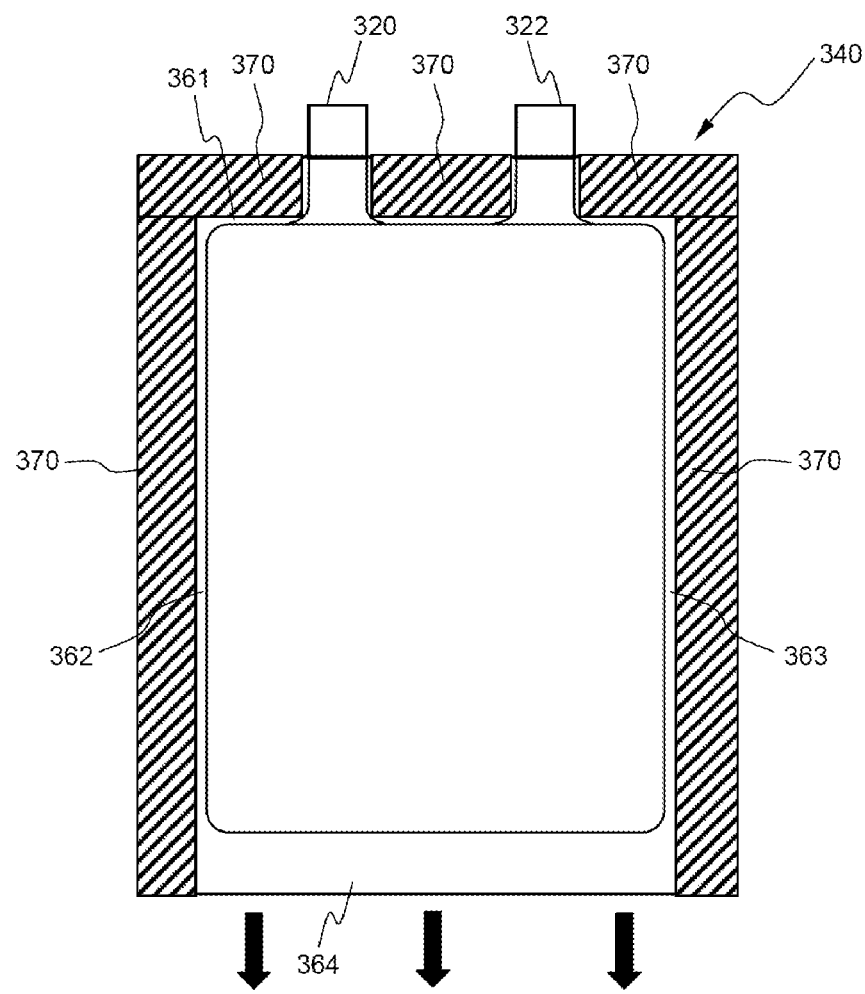
FIG. 7 is a typical view showing a battery cell configured to have a structure in which a sealing reinforcement tape is attached to a first thermally bonded surplus part shown in FIG. 6.

FIG. 7 is a typical view showing a battery cell configured to have a structure in which a tape is attached to the first thermally bonded surplus part shown in FIG. 6.

Referring to FIG. 7, the seal reinforcement tapes 370 are attached to the second thermally bonded edge 362 and the third thermally bonded edge 363. In addition, the seal reinforcement tapes 370 are further attached to the regions of the first thermally bonded edge 361 of the battery case 340 excluding the regions of the first thermally bonded edge 361 from which the positive electrode lead 320 and the negative electrode lead 322 protrude.

A venting guide part is located at the fourth thermally bonded edge 364, to which the seal reinforcement tapes are not attached. Consequently, gas is discharged in the direction indicated by lower arrows.

Figure 8:
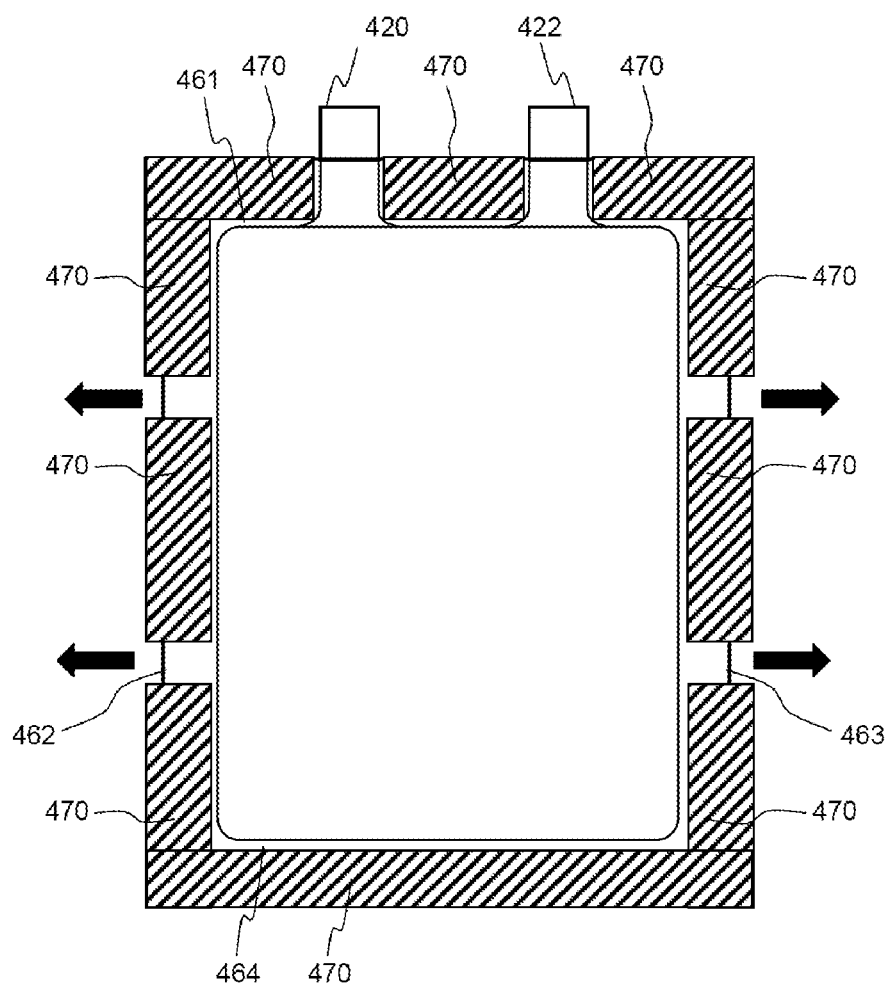
FIG. 8 is a typical view showing a battery cell having sealing reinforcement tapes according to a further embodiment of the present invention attached thereto.

FIG. 8 is a typical view showing a battery cell having sealing reinforcement tapes according to a further embodiment of the present invention attached thereto Referring to FIG. 8, seal reinforcement tapes 470 are attached to the remaining portions of a first thermally bonded edge 461 of the battery cell, denoted by reference numeral 400, excluding the regions of the first thermally bonded edge 461 from which a positive electrode lead 420 and a negative electrode lead 422 protrude. A seal reinforcement tape 470 is also attached to the a fourth thermally bonded edge 464.

Seal reinforcement tapes 470 are partially attached to a second thermally bonded edge 462 and a third thermally bonded edge 463 such that the seal reinforcement tapes 470 are arranged at intervals so as to form venting guide parts at the second thermally bonded edge 462 and the third thermally bonded edge 463.

The structure of the battery cell according to this embodiment is identical to that of the battery cell according to the previous embodiment except that the battery cell according to this embodiment is different from the battery cell according to the previous embodiment in terms of the positions at which the seal reinforcement tapes are attached and the position at which the venting guide parts are located, and therefore a duplicate description thereof will be omitted.

Figure 9:
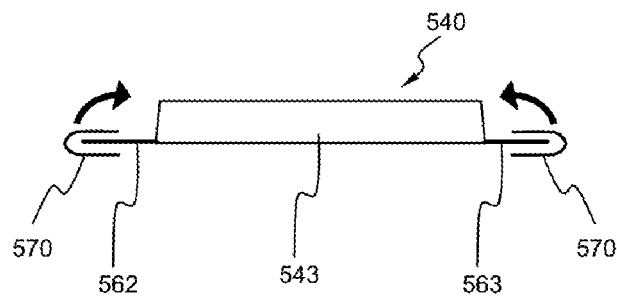
FIGS. 9 to 11 are typical views showing battery cells according to the present invention having sealing reinforcement tapes attached to thermally bonded surplus parts.
Figure 10:
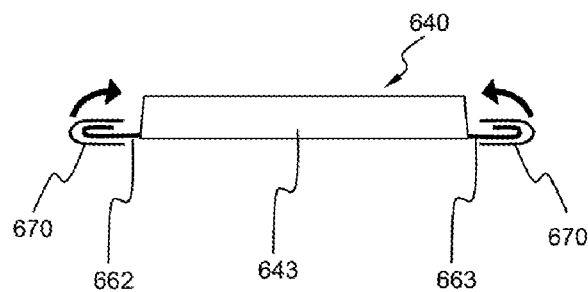
Figure 11:
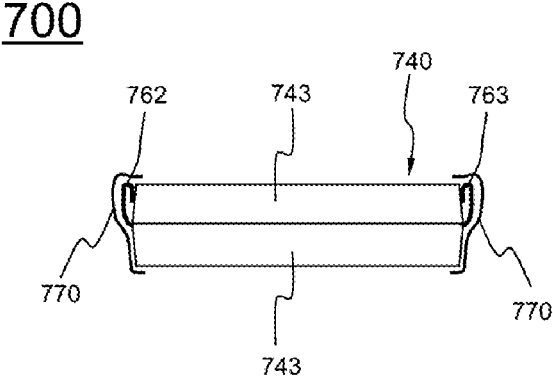

FIGS. 9 to 11 are typical views showing battery cells according to embodiments of the present invention having sealing reinforcement tapes attached to thermally bonded surplus parts.

Referring to FIG. 9, a second thermally bonded edge 562 and a third thermally bonded edge 563 of a battery cell 500 are bent vertically toward the outer surface of a receiving part 453 of a battery case 540 in directions indicated by arrows in the state in which seal reinforcement tapes 570 are attached to the second thermally bonded edge and the third thermally bonded edge.

Referring to FIG. 10, a second thermally bonded edge 662 and a third thermally bonded edge 663 of a battery cell 600 are bent toward the outer surface of a receiving part 643 of a battery case 640 in the state in which ends of the second thermally bonded edge and the third thermally bonded edge are bent once toward the receiving part 643 and seal reinforcement tapes 670 are attached to the second thermally bonded edge and the third thermally bonded edge.

Referring to FIG. 11, a second thermally bonded edge 762 and a third thermally bonded edge 763 of a battery cell 700 are bent toward the outer surface of a receiving part 743 of a battery case 740 in the state in which ends of the second thermally bonded edge and the third thermally bonded edge are bent once toward the receiving part 743, and the bent second thermally bonded edge 762 and the bent third thermally bonded edge 763 are surrounded by seal reinforcement tapes 770.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

As is apparent from the above description, in a battery cell of a venting structure using taping, seal reinforcement tapes are attached to some thermally bonded edges so as to surround outer ends of the thermally bonded edges such that gas generated in a receiving part during charge and discharge of the battery cell is discharged out of the receiving part through venting guide parts located at the remainder of the thermally bonded edges to which the seal reinforcement tapes are not attached, thereby improving the safety of the battery cell.

In addition, the structure of the battery cell is simplified and the manufacturing process of the battery cell is also simplified, thereby improving the safety of the battery cell.

The invention claimed is:

1. A battery cell having an electrode assembly, configured to have a structure in which a separator is interposed between a positive electrode and a negative electrode, mounted in a battery case, the battery cell comprising:
   a battery case comprising a first case and a second case, at least one of the first and second cases being provided with a receiving part for receiving the electrode assembly, thermally bonded edges for sealing the receiving part being provided outside the receiving part;
   a positive electrode lead and a negative electrode lead protruding outward from the battery case; and
   an electrode assembly received in the battery case, the electrode assembly having electrode tabs protruding from one end thereof, the electrode tabs being coupled to the positive electrode lead and the negative electrode lead, wherein
   seal reinforcement tapes are attached to externally-facing surfaces of some of the thermally bonded edges so as to surround outer ends of the some thermally bonded edges and configured such that gas generated in the receiving part during charge and discharge of the battery cell is discharged out of the receiving part through a venting guide part located at the remainder of the thermally bonded edges to which the seal reinforcement tapes are not attached.

2. The battery cell according to claim 1, wherein the battery case is a pouch-shaped case made of a laminate sheet comprising a resin layer and a metal layer.

3. The battery cell according to claim 1, wherein the thermally bonded edges comprise a first thermally bonded edge formed at a region of the battery case at which at least one of the electrode leads is formed, a second thermally bonded edge and a third thermally bonded edge formed at opposite sides of the first thermally bonded edge, and a fourth thermally bonded edge formed at a region of the battery case so as to be opposite the first thermally bonded edge.

4. The battery cell according to claim 3, wherein the positive electrode lead protrudes from the first thermally bonded edge, and the negative electrode lead protrudes from the fourth thermally bonded edge.

5. The battery cell according to claim 4, wherein the seal reinforcement tapes are attached to the second thermally bonded edge and the third thermally bonded edge.

6. The battery cell according to claim 5, wherein the venting guide part is located at the first thermally bonded edge or the fourth thermally bonded edge.

7. The battery cell according to claim 5, wherein the seal reinforcement tapes are further attached to the remaining regions of the first thermally bonded edge excluding a region of the first thermally bonded edge from which the positive electrode lead protrudes.

8. The battery cell according to claim 4, wherein the seal reinforcement tapes are attached to parts of at least one selected from between the second thermally bonded edge and the third thermally bonded edge such that the venting guide part is formed at the at least one selected from between the second thermally bonded edge and the third thermally bonded edge.

9. The battery cell according to claim 5, wherein the seal reinforcement tapes are further attached to the remaining regions of the fourth thermally bonded edge excluding a region of the fourth thermally bonded edge from which the negative electrode lead protrudes.

10. The battery cell according to claim 3, wherein both the positive electrode lead and the negative electrode lead protrude from the first thermally bonded edge.

11. The battery cell according to claim 10, wherein the seal reinforcement tapes are attached to the second thermally bonded edge and the third thermally bonded edge.

12. The battery cell according to claim 11, wherein the venting guide part is located at the first thermally bonded edge or the fourth thermally bonded edge.

13. The battery cell according to claim 11, wherein the seal reinforcement tapes are further attached to the remaining regions of the first thermally bonded edge excluding a region of the first thermally bonded edge from which the positive electrode lead and the negative electrode lead protrude.

14. The battery cell according to claim 10, wherein the seal reinforcement tapes are attached to parts of at least one selected from among the second thermally bonded edge, the third thermally bonded edge, and the fourth thermally bonded edge such that the venting guide part is formed at the at least one selected from among the second thermally bonded edge, the third thermally bonded edge, and the fourth thermally bonded edge.

15. The battery cell according to claim 1, wherein the seal reinforcement tapes are further attached to the remainder of the thermally bonded edges at which the electrode leads are located, and the seal reinforcement tapes attached to the remainder of the thermally bonded edges at which the electrode leads are located are provided with slits through which the electrode leads extend.

16. The battery cell according to claim 5, wherein the second thermally bonded edge and the third thermally bonded edge are bent vertically toward an outer surface of the receiving part, and the seal reinforcement tapes are attached to the bent thermally bonded edges so as to surround the bent thermally bonded edges.

17. The battery cell according to claim 5, wherein the second thermally bonded edge and the third thermally bonded edge are bent twice or more toward an outer surface of the receiving part, and the seal reinforcement tapes are attached to the bent thermally bonded edges so as to surround the bent thermally bonded edges.

18. The battery cell according to claim 1, wherein each of the seal reinforcement tapes is an adhesive tape having an adhesive applied to one surface of a film made of an electrically insulative material.

19. A battery pack comprising the battery cell according to claim 1.

20. A device comprising the battery pack according to claim 19.

* * * * *